United States Patent
Al-Hashmy et al.

(10) Patent No.: US 12,078,278 B2
(45) Date of Patent: Sep. 3, 2024

(54) ROBOTIC TOOLS FOR TUBULARS REPAIR

(71) Applicant: Saudi Arabian Oil Company, Dhahran (SA)

(72) Inventors: Hasan Ali Al-Hashmy, Dhahran (SA); Abdullah Alzubail, Saihat (SA); Abderrahim Fakiri, Dhahran (SA); Abdullatif Jazzar, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 319 days.

(21) Appl. No.: 17/498,395

(22) Filed: Oct. 11, 2021

(65) Prior Publication Data
US 2023/0113354 A1 Apr. 13, 2023

(51) Int. Cl.
*F16L 55/1645* (2006.01)
*F16L 55/165* (2006.01)
(Continued)

(52) U.S. Cl.
CPC ....... *F16L 55/1645* (2013.01); *F16L 55/1656* (2013.01); *F16L 55/175* (2013.01);
(Continued)

(58) Field of Classification Search
CPC .............................. F16L 55/168; F16L 55/175
(Continued)

(56) References Cited

U.S. PATENT DOCUMENTS

| 1,838,686 A | * | 12/1931 | De La Mare ......... F16L 55/175 285/15 |
| 3,594,247 A | | 7/1971 | Pennington et al. |

(Continued)

FOREIGN PATENT DOCUMENTS

| CN | 106273533 | 6/2018 |
| CN | 207814748 | 9/2018 |

(Continued)

OTHER PUBLICATIONS

Altair.com [online], "Fully Automated in a Single Process: Optimization & Manufacturing of CFRP Components," Altair, retrieved on Oct. 17, 2019, from URL: <https://www.altair.com/ResLibDownload.aspx?file_id2=3669>, 2 pages.

(Continued)

*Primary Examiner* — David R Deal
(74) *Attorney, Agent, or Firm* — Fish & Richardson P.C.

(57) ABSTRACT

Robotic tools, methods, and systems for repairing pipes in-situ are described. A robotic tool includes a body with an annular, cylindrical configuration with a first end and a second end opposite the first end, the body having an inner surface defining an axis; a printing arm attached to the inner surface of the robotic body using a track, the printing arm circumferentially movable along the inner surface of the body; a printing head attached to the printing arm, the printing head movable radially along the printing arm and axially relative to the printing arm; and a plurality of legs positioned at axial intervals around the robotic body, each leg pivotably attached to the robotic body at either the first end or the second end of the body and pivotable between an open position and a closed position.

19 Claims, 8 Drawing Sheets

(51) Int. Cl.
*F16L 55/175* (2006.01)
*F16L 55/32* (2006.01)
*F16L 55/40* (2006.01)
*F16L 101/18* (2006.01)

(52) U.S. Cl.
CPC .............. *F16L 55/32* (2013.01); *F16L 55/40* (2013.01); *F16L 2101/18* (2013.01)

(58) Field of Classification Search
USPC .................................. 138/99, 97; 405/150.2
See application file for complete search history.

(56) References Cited

U.S. PATENT DOCUMENTS

| | | | |
|---|---|---|---|
| 4,529,139 | A | 7/1985 | Smith et al. |
| 4,588,538 | A | 5/1986 | Chung et al. |
| 4,749,534 | A | 6/1988 | Robretson |
| 4,822,444 | A | 4/1989 | Weingart et al. |
| 4,838,971 | A | 6/1989 | Cacak |
| 4,997,503 | A | 3/1991 | Bohannan et al. |
| 5,171,630 | A | 12/1992 | Muzzy et al. |
| 5,280,670 | A * | 1/1994 | Toomey .............. B29C 65/7802 29/402.13 |
| 5,540,797 | A | 7/1996 | Wilson |
| 5,936,861 | A | 8/1999 | Jang et al. |
| 6,179,945 | B1 | 1/2001 | Greenwood et al. |
| 6,240,965 | B1 * | 6/2001 | Maimets ............... F16L 55/163 29/402.09 |
| 6,558,146 | B1 | 5/2003 | Shah et al. |
| 6,737,134 | B2 | 5/2004 | Friedrich et al. |
| 7,815,141 | B2 | 10/2010 | Uozumi et al. |
| 7,905,442 | B2 | 3/2011 | Uozumi et al. |
| 9,757,905 | B2 | 9/2017 | Harasin et al. |
| 9,937,673 | B1 | 4/2018 | Oakes, III et al. |
| 2002/0148553 | A1 | 10/2002 | Campbell, Jr. |
| 2013/0008548 | A1 * | 1/2013 | Bowers ................... F16L 13/02 138/97 |
| 2014/0050862 | A1 | 2/2014 | Borger |
| 2014/0328963 | A1 | 11/2014 | Mark et al. |
| 2015/0360423 | A1 | 12/2015 | Torres et al. |
| 2016/0144566 | A1 | 5/2016 | Mark et al. |
| 2018/0229429 | A1 | 8/2018 | Tyler et al. |
| 2018/0274697 | A1 * | 9/2018 | Fowkes ................. F16L 58/181 |
| 2019/0009472 | A1 | 1/2019 | Mark |
| 2020/0086571 | A1 | 3/2020 | Castillo et al. |
| 2020/0306869 | A1 | 10/2020 | Hardwick et al. |
| 2021/0041052 | A1 | 2/2021 | Furcoiu |
| 2021/0178659 | A1 | 6/2021 | Fakiri et al. |
| 2021/0178669 | A1 | 6/2021 | Fakiri et al. |
| 2021/0187817 | A1 | 6/2021 | Al-Hashmy et al. |

FOREIGN PATENT DOCUMENTS

| | | |
|---|---|---|
| CN | 208967318 | 6/2019 |
| DE | 102014100711 | 7/2015 |
| EP | 2324994 | 5/2011 |
| EP | 3219474 | 9/2017 |
| JP | S5547351 | 3/1980 |
| KR | 101259494 | 5/2013 |
| WO | WO 2008033504 | 3/2008 |
| WO | WO 2015024363 | 2/2015 |
| WO | WO 2016107808 | 7/2016 |
| WO | WO 2017100991 | 6/2017 |
| WO | WO 2017137233 | 8/2017 |

OTHER PUBLICATIONS

Colombo et al., "Optimization of filament winding parameters for the design of a composite pipe," Composites Part B: Engineering, vol. 148, Sep. 2018, 207-216, 28 pages.
Dti.dk [online], "3D printed cylinders make sewer pipe repairs more efficient" Sep. 2021, [retrieved on Sep. 29, 2021], retrieved from : URL <https://www.dti.dk/specialists/3d-printed-cylinders-make-sewer-pipe-repairs-more-efficient/41745>, 3 pages.
Frketic et al., "Automated manufacturing and processing of fiber-reinforced polymer (FRP) composites: An additive review of contemporary and modern techniques for advanced materials manufacturing," Additive Manufacturing, 14, Jan. 2017, 54 pages.
Gonzalez-Henriquez et al., "3.21 Filament Winding Applications," Comprehensive Composite Materials II, vol. 3, 2018, 556-577, 22 pages.
Koustas et al., "On the development of a filament winding robotic system," Procedia Manufacturing, vol. 17, 2018, 919-926, 8 pages.
Minsch et al., "Analysis of Filament Winding Processes and Potential Equipment Technologies," Procedia CIRPvol. 66, 2017, 125-130, 6 pages.
Munro, "Review of manufacturing of fiber composite components by filament winding" Polymer Composites, vol. 9, issue 5, Oct. 1988, 352-359, 8 pages.
Yang et al., "3D printing for continuous fiber reinforced thermoplastic composites: Mechanism and performance," Rapid Prototyping Journal, vol. 23, No. 1, Jan. 2017, 209-215, 7 pages.
SAIP Examination Report in Saudi Arabian Appln. No. 122440355, dated Sep. 29, 2023, 13 pages, with English Translation.

* cited by examiner

ROBOTIC TOOLS FOR TUBULARS REPAIR

TECHNICAL FIELD

The present disclosure generally relates to tools, methods, and systems for tubulars repair, more particularly, in-situ repairs of elevated pipes.

BACKGROUND

Excessive differential pressure imposed during production, operation, and maintenance of wells can cause pipes (e.g., metallic and nonmetallic pipes) to crack and fail which leads to onsite operational shutdowns to perform repairs. The cracks and failures in pipes can be a result of wall loss (i.e., a loss of material on the internal or external surface of the pipeline, tube, or casing).

SUMMARY

This specification describes robotic tools, methods, and systems for in-situ repair of pipes in elevated places. During operation, under excessive differential pressure, the pipelines can suffer wall loss that leads to failure of pipes and operational shutdowns to perform onsite repairs.

These tools, methods, and systems provide an approach that allows in-situ repairing of pipes using robotic tools. The robotic tools can include a body, a printing arm, a printing head, a control system, and a plurality of legs. The printing arm is attached to an inner surface of the body and can circumferentially move along the inner surface of the body. The printing head is attached to the printing arm and can move radially along the printing arm. In some implementations, the printing arm also has the ability to change length so that it can better position relative to the pipe and execute repairs. The printing arm can move in x, y, and z-directions. The control system helps the robotic tool to locate the damaged area of the pipe and can be positioned near the printing arm or can be a part of the printing arm. The plurality of legs can be positioned at axial intervals around the robotic body, each leg is pivotably attached to the robotic body and operates between an open position and a closed position. Each leg can slide along the damaged pipe and help conform the robotic tool to the size of the pipe. The methods allow initial patching of the pipe areas (e.g., pipe areas with wall loss). The methods can include depositing a mesh of fibers at two different angle orientations and depositing a final polymer layer (e.g., thermoplastic fiber material) over the same area where the two layers of fiber mesh were deposited at two different angles. The approach allows for remote repairs without physical human intervention and can reduce risk and time during operation.

In some aspects, a robotic tool for repairing pipes in-situ includes: a body with an annular, cylindrical configuration with a first end and a second end opposite the first end, the body having an inner surface defining an axis; a printing arm attached to the inner surface of the robotic body using a track, the printing arm circumferentially movable along the inner surface of the body; a printing head attached to the printing arm, the printing head movable radially along the printing arm and axially relative to the printing arm; and a plurality of legs positioned at axial intervals around the robotic body, each leg pivotably attached to the robotic body at either the first end or the second end of the body and pivotable between an open position and a closed position.

Embodiments of the robotic tool for repairing pipes in-situ can include one or more of the following features.

In some embodiments, the inner surface of the body defines the track, the track extending circumferentially along the inner surface.

In some embodiments, the printing arm changes length.

In some embodiments, each of the plurality of legs is attached to the robotic body with a hinge.

In some embodiments, each of the plurality of legs includes a rotating end member at a free end of the leg. In some cases, the rotating end member includes a magnetic material. In some cases, the rotating end member includes a wheel. In some cases, the rotating end member allows each leg to slide along a length of a damaged pipe up until the robotic tool reaches a damaged area of the pipe. In some cases, the rotating end member allows each leg to transition to a closed position and the robotic tool to conform to a size of the damaged pipe.

In some embodiments, the body has a clamshell configuration.

In some embodiments, the robotic tool is controlled by a wireless controller.

In some embodiments, the printing head includes: a fiber spreader configured to spread dry fiber tows; a polymer extruder; and a movable die fluidically coupled to the polymer extruder to receive molten polymer from the polymer extruder, and the movable die configured to receive the spread dry fiber tows from the fiber spreader.

In some aspects, a robotic system for repairing pipes in-situ includes: a body with an annular, cylindrical configuration with a first end and a second end opposite the first end, the body having an inner surface defining an axis; a printing arm attached to the inner surface of the robotic body using a track; a printing head attached to the printing arm, the printing head includes; a fiber spreader configured to spread dry fiber tows; a polymer extruder; and a movable die fluidically coupled to the polymer extruder to receive molten polymer from the polymer extruder, the movable die configured to receive the spread dry fiber tows from the fiber spreader; a plurality of legs positioned at axial intervals around the robotic body; and a communication device communicably connected to the body, and the printing arm.

Embodiments of the robotic system for repairing pipes in-situ can include one or more of the following features.

In some embodiments, the movable die includes an internal grooved surface defining longitudinal grooves extending between an inlet of the movable die and an outlet of the movable die through which the fiber tows exit the movable die, the inlet configured to receive the spread dry fiber tows from the fiber spreader. In some cases, the movable die includes an internal channel configured to flow the molten polymer from a fluid inlet of the internal channel to the dry fiber tows to wet the dry fiber tows. In some cases, the longitudinal grooves are configured to help prevent the wet fiber tows from mingling as the wet fiber tows move along the longitudinal grooves to exit the movable die. In some cases, the die is configured to deposit a layer of the wet fiber tows on a printing surface to form a thermoplastic component of one or more layers of fiber tows on the printing surface. In some cases, the printing surface comprises a pipe.

In some aspects, a method for repairing pipes in-situ includes: identifying a plurality of locations with a gap or with a loose inner thickness in a pipe; positioning a robotic tool above the identified gap location of the pipe and conforming the robotic tool to a circumference of the pipe; depositing a first layer of mesh of fibers at a first angle orientation to cover the gap of the pipe; depositing a second layer of mesh of fibers at a second angle orientation to cover the gap of the pipe, the second angle orientation being different than the first angle orientation; depositing a final layer including a thermoplastic fiber material on top of the second layer of mesh of fibers; and closing the identified gap location of the pipe to withstand high-pressure operations.

The robotic tools with a printing approach can save time and cost that can result from operational shutdowns due to pipe repairs as the tools are used onsite using a robotic 3D printing device. These tools and methods are beneficial for pipes at elevated places where access to conduct maintenance and repairs can be challenging. It is also applicable to other oil and gas operating systems that have a cylindrical shape and may exhibit damage (e.g., damage due to wall loss).

The oil is moved through the pipelines by pump stations along the pipeline. Natural gas (or similar gaseous fuels) is pressurized into liquids. To protect pipes from impact, abrasion, and corrosion, a variety of methods are used. However, besides the implementation of the protective methods pipelines still suffer from wall loss due to the presence of differential pressure over time. It can be challenging to repair damaged pipes at elevated places due to limited access to the site and the need to shut down the operation. The described robotic tool includes a printing approach that can save time and cost due to operational shutdowns by performing onsite pipe repairs.

This approach can eliminate the need to disassemble and rotate the pipe throughout the repair process as required by other manufacturing and repair processes (e.g., filament winding). Other manufacturing processes provide repair only on the surface. Instead, the described approach fills the gaps due to wall loss in the pipe with polymer material and provides a stable base structure for the repaired location before the final surface layer is deposited. The stable base structure can eliminate deposition instabilities and deformation.

The details of one or more embodiments of these tools, systems, and methods are set forth in the accompanying drawings and the description below. Other features, objects, and advantages of these methods will be apparent from the description, the drawings, and from the claims.

DETAILED DESCRIPTION

This specification describes robotic tools, methods, and systems for in-situ repair of pipes in elevated places. During operation, under excessive differential pressure, the pipelines can suffer wall loss that leads to failure of pipes and operational shutdowns to perform onsite repairs.

These tools, methods, and systems provide an approach that allows in-situ repairing of pipes using robotic tools. The robotic tools can include a body, a control system, a printing arm, a printing head, and a plurality of legs. The printing arm is attached to an inner surface of the body and can circumferentially move along the inner surface of the body. The printing head is attached to the printing arm and can move radially along the printing arm. In some implementations, the printing arm also has the ability to change length so that it can better position itself relative to the pipe and execute repairs. The printing arm can move in x, y, and z-directions. The control system helps the robotic tool to locate the damaged area of the pipe and can be positioned near the printing arm or can be a part of the printing arm. The plurality of legs can be positioned at axial intervals around the robotic body, each leg is pivotably attached to the robotic body and operates between an open position and a closed position. Each leg can slide along the damaged pipe and help conform the robotic tool to the size of the pipe. The methods allow initial patching of the pipe areas (e.g., pipe areas with wall loss). The methods can include depositing a mesh of fibers at two different angle orientations and depositing a final polymer layer (e.g., thermoplastic fiber material) over the same area where the two layers of fiber mesh were deposited at two different angles. The approach allows for remote repairs without physical human intervention and can reduce risk and time during operation.

Figure 1:
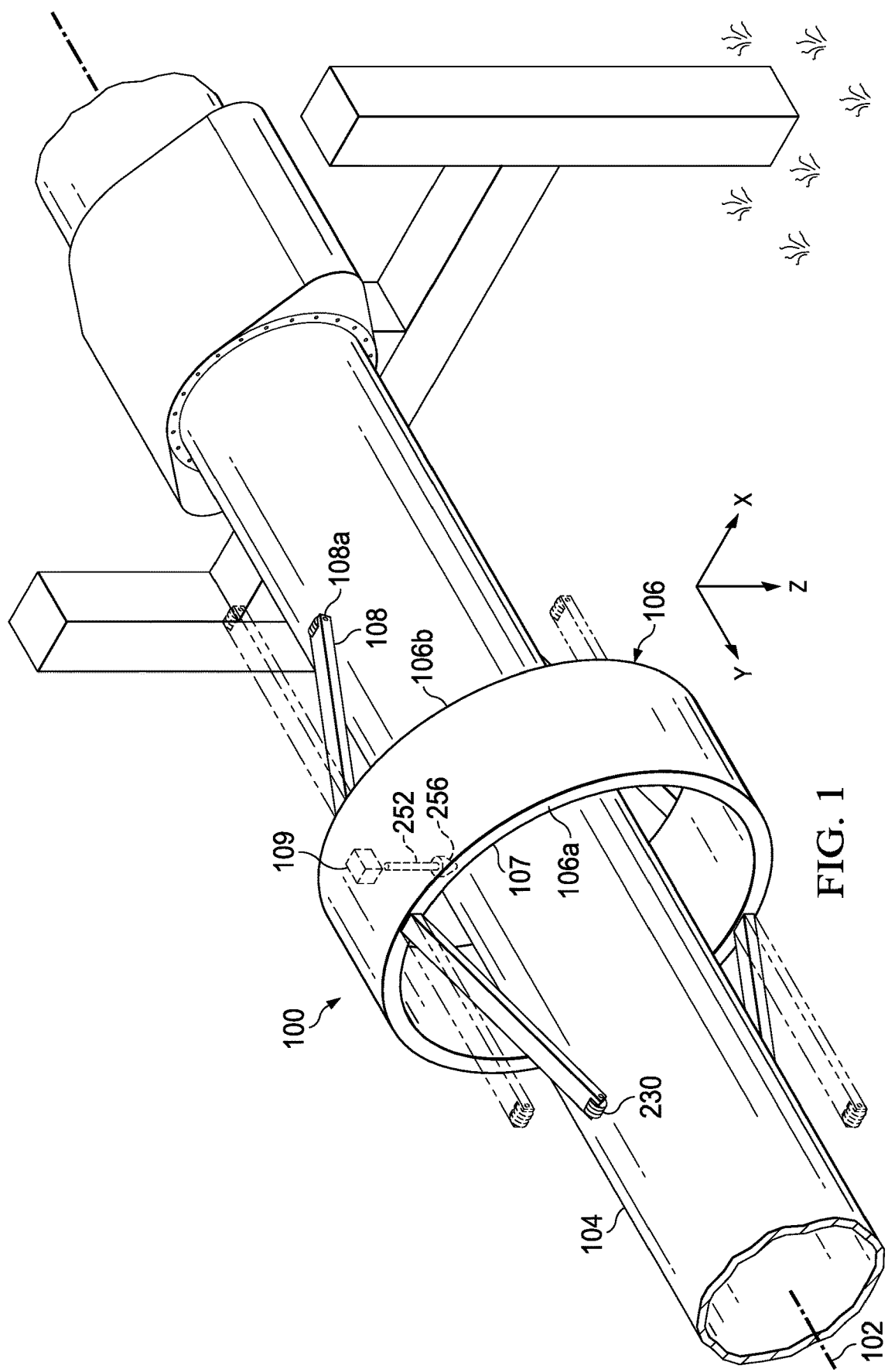
FIG. 1 is a schematic view of a robotic tool deployed on an elevated pipe.

FIG. 1 is a schematic view of a robotic tool 100 deployed on an elevated pipe 104. The robotic tool 100 includes a body 106, a plurality of legs 108, a control system 109, a printing arm 252, and a printing head 256. The body 106 has an annular, cylindrical configuration with a first end 106a and a second end 106b opposite the first end 106a. In some implementations, the body 106 has a clamshell configuration. The body 106 has an inner surface 107 defining an axis 102. The plurality of legs 108 is positioned at axial intervals around the robotic body 106 and each leg is pivotably attached to the robotic body 106 with a hinge. Some legs 108 are positioned at the first end 106a and some legs 108 are positioned at the second end 106b. In some implementations, each of the plurality of legs 108 has a spider-like configuration. Each of the legs 108 includes a rotating end member 230 at a free end 108a of the leg 108. The rotating end member 230 can include magnetic material. In tool 100, the rotating end members 230 are wheels. In an open position (i.e., shown with dotted lines), the rotating end member 230 allows each leg 108 to slide along the length of the damaged pipe 104 up till the control system 109 of the robotic tool 100 detects the damaged area of the pipe 104. Once the damaged area is identified, each leg 108 transitions to a closed position (i.e., shown with solid lines) and the robotic tool 100 conforms to the size of the pipe 104.

The robotic tool 100 includes a control system 109 that helps identify the damaged area in the pipe 104. The control system 109 can be embedded into the body 106 of the robotic tool 100. The control system 109 includes sensor module placed inside a sealable chamber. The sensor module includes features that can identify damaged areas of the pipe. The control system 109 is in electronic communication with the sensor module. The sensor module includes sensors, instrumentation and signal processing circuits, receivers, transmitters, and data storing and processing devices. The sensor module acquires real-time measurement data of the damaged areas of the pipe 104 and transfers it to a data processing unit of the control system 109 for analysis and calculations. In some implementations, the robotic tool 100 is controlled with a wireless remote control system and with a help of a site technician. In some implementations, the robotic tool 100 is a self-driving autonomous device. In some implementations, the robotic tool 100 includes a camera that is programmed to detect the gap in the pipe 104 due to wall loss. In some implementations, the gap in pipe 104 is detected with manual inspection or with the use of inspection robotics. The results of the inspection data can be feed into the robotic tool 100.

Figure 2A:
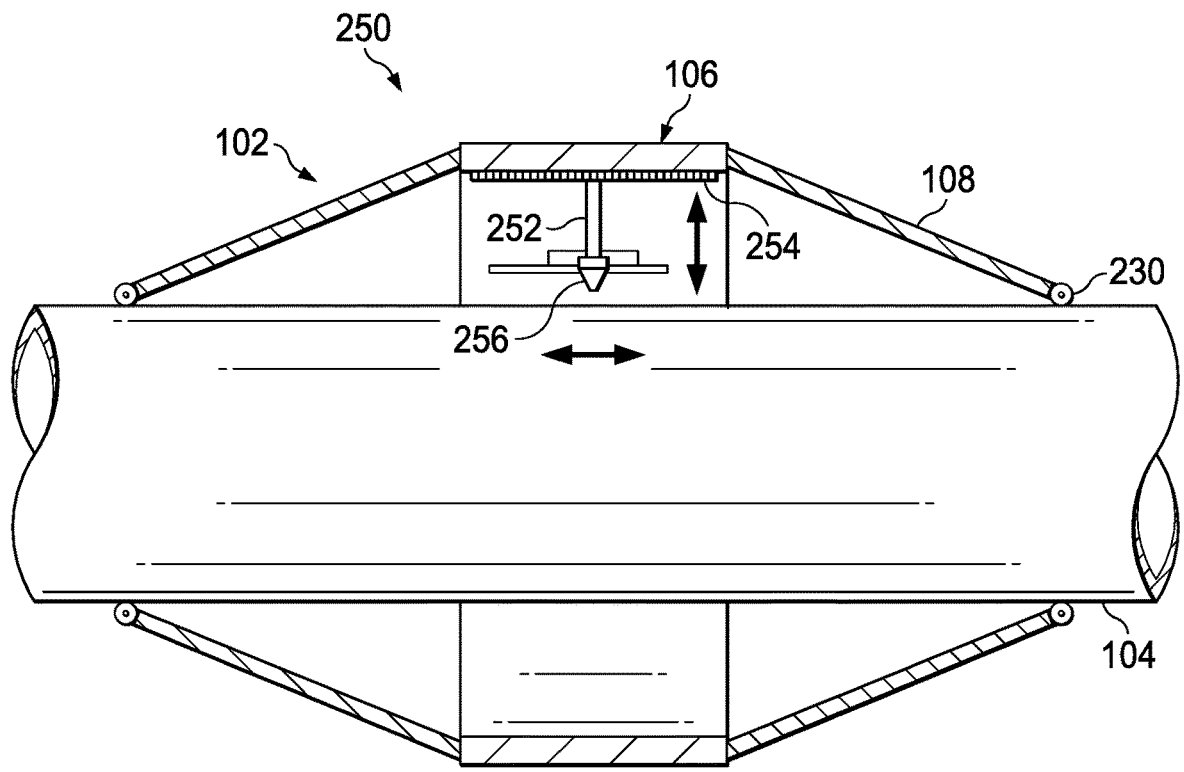
FIGS. 2A-2B are schematic views of the deployed robotic tool including a printing arm.
Figure 2B:
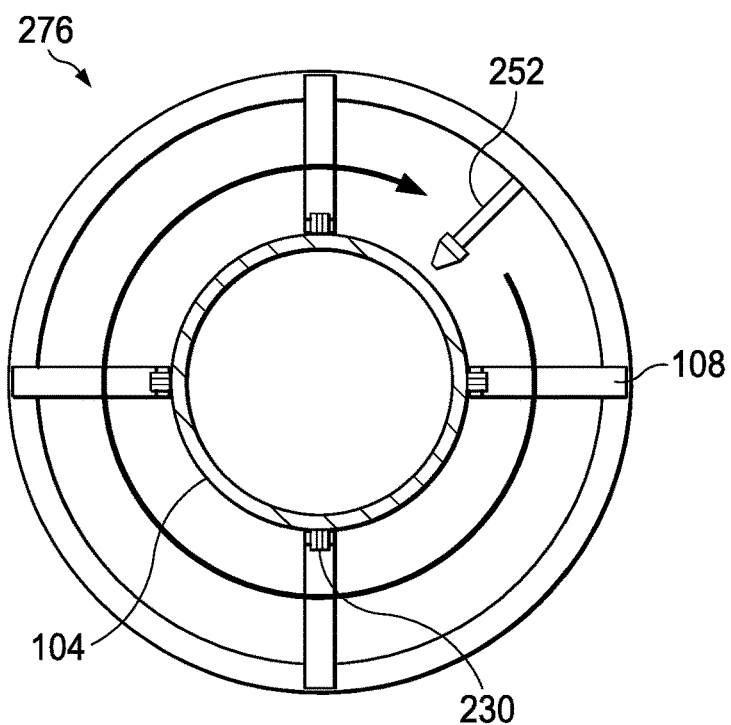

FIGS. 2A-2B are schematic views 250 of the deployed robotic tool 100 including a printing arm 252. The robotic tool 100 has a clockwise direction of motion 276. The printing arm 252 is attached to the inner surface 107 of the body 106. In some implementations, the printing arm 252 is attached to the inner surface 107 of the body 106 using a built-in track 254. Track 254 extends circumferentially along the inner surface 107 of the body 106. The cylindrical shape of the body 106 allows the printing arm 252 to circumferentially move along the inner surface 107 of the body 106 and exhibit a 360 degrees clockwise circular motion 276 around the pipe 104 (FIG. 2B). In some implementations, the printing arm 252 is a 3D printing arm and can move in x, y, and z-directions. In some implementations, the printing arm 252 has the ability to change length so that it can better position itself relative to the pipe 104 and execute repairs. The printing head 256 is attached to the printing arm 252 and can move radially along the printing arm 252. The printing head 256 includes a unidirectional continuous thermoplastic fibers printing apparatus with the ability to repair damaged pipes due to wall loss.

Figure 3:
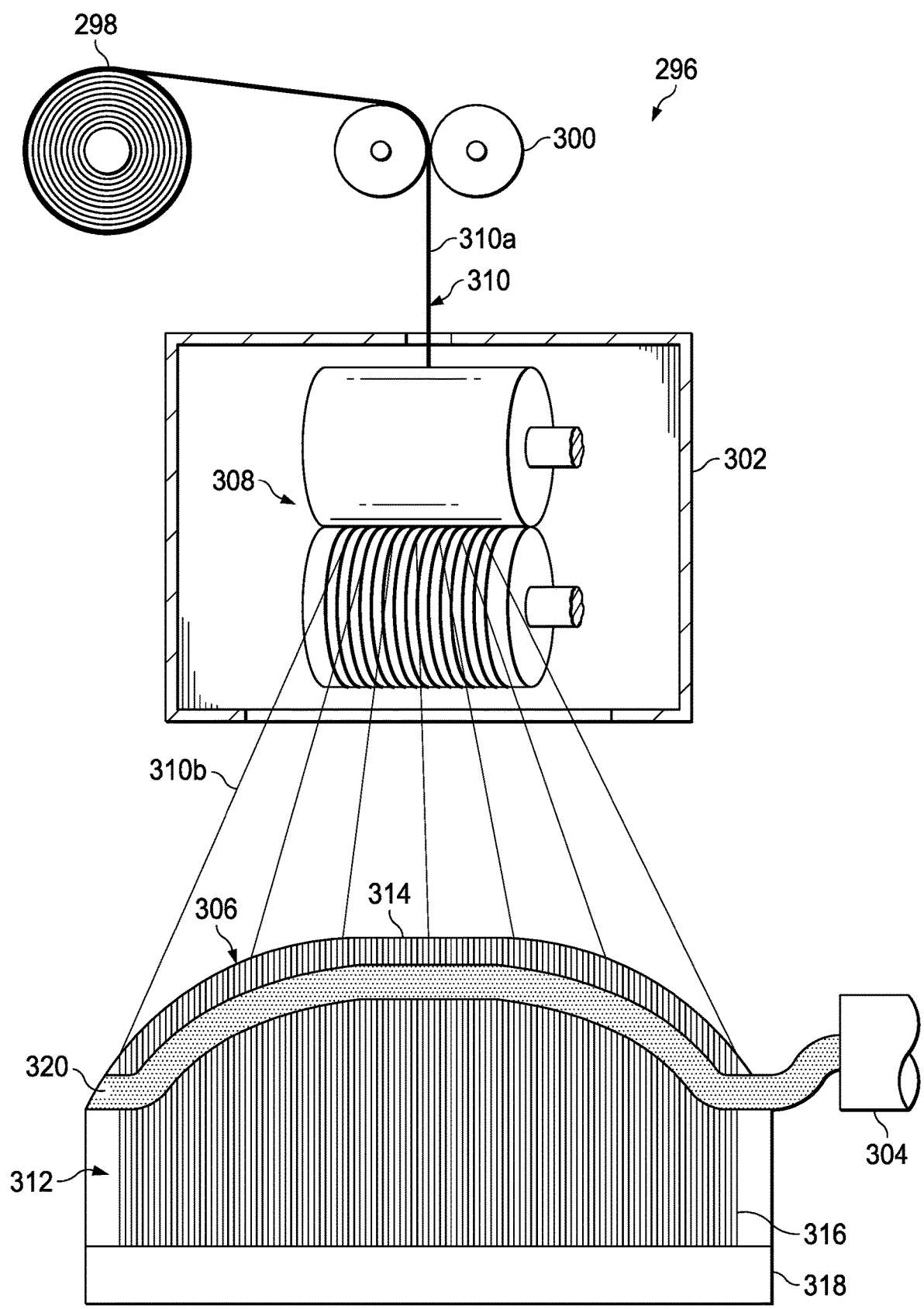
FIG. 3 is a schematic view of a printing apparatus.

FIG. 3 is a schematic view of a printing apparatus 296. The printing apparatus 296 is deployed inside the printing arm 252 (described earlier in reference to FIGS. 1-2). The printing apparatus 296 includes a fiber feed container 298, fiber adjustment roller gears 300, fiber separation casing 302, a grooved die, a polymer extruder 304 fluidically coupled to the grooved die 306, and one or more fiber spreaders 308 that spread dry fiber tows 310a to a continuous warp of spread fiber tows 310b. The printing apparatus 296 also includes an additive manufacturing actuator system (not shown) coupled to the die 306. The printing apparatus 296 has a grooved die 306 with a grooved surface 312 that spans the length of the grooved die 306. The grooved die 306 receives the spread dry fiber tows 310 from a top inlet 314.

Figure 4:
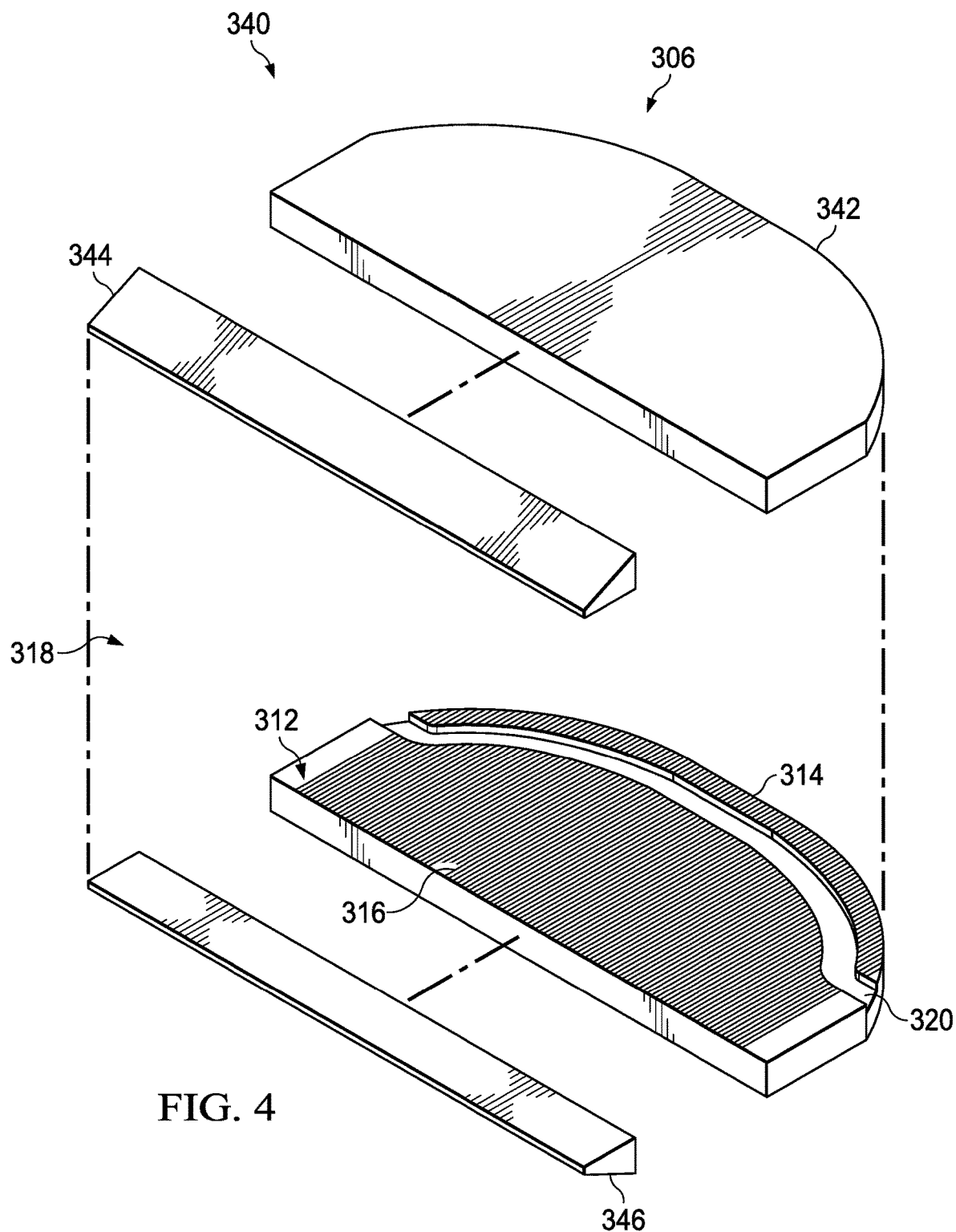
FIG. 4 is a perspective exploded view of a grooved die of the printing apparatus of FIG. 3.

FIG. 4 is a perspective exploded view 340 of a grooved die 306 of the printing apparatus 296 of FIG. 3. The grooved die 306 has a grooved surface 312 that defines longitudinal grooves 316 that extends from the inlet 314 of the grooved die 306 to the outlet 318 of the grooved die 306. The internal fluid channel 320 of the grooved die 306 is disposed at the internal grooved surface 312 and extends laterally across the internal grooved surface 312. The internal fluid channel 320 flows the molten polymer across the longitudinal grooves 316 to wet the dry fiber tows 310 as the fiber tows move along the longitudinal grooves 316. The fluid channel 320 has a fluid inlet 314 that is disposed at a first elevation with respect to the outlet 318 of the grooved die 306. The outlet 318 has a top member 344 and a bottom member 346. The grooved surface 312 includes a top surface 342.

Figure 5A:
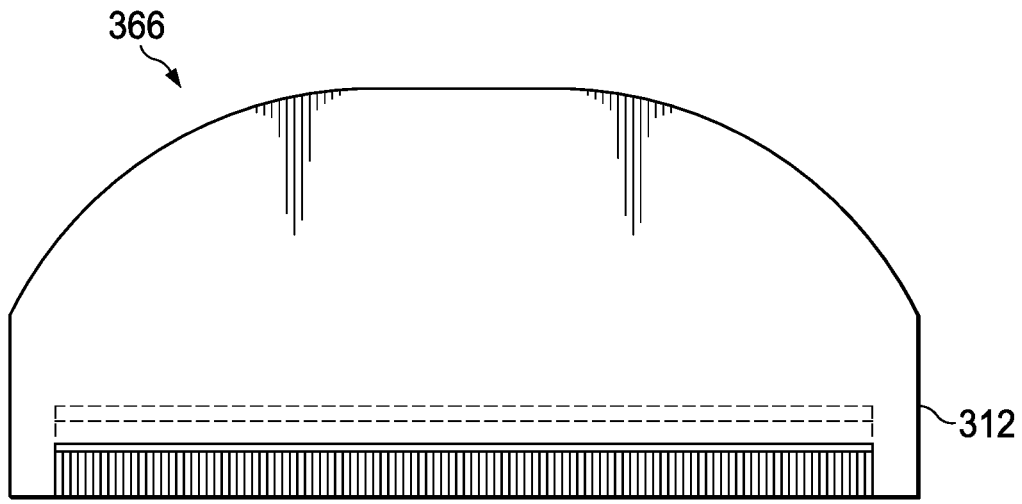
FIGS. 5A-5C are top views of each portion of the grooved die of FIG. 4.
Figure 5B:
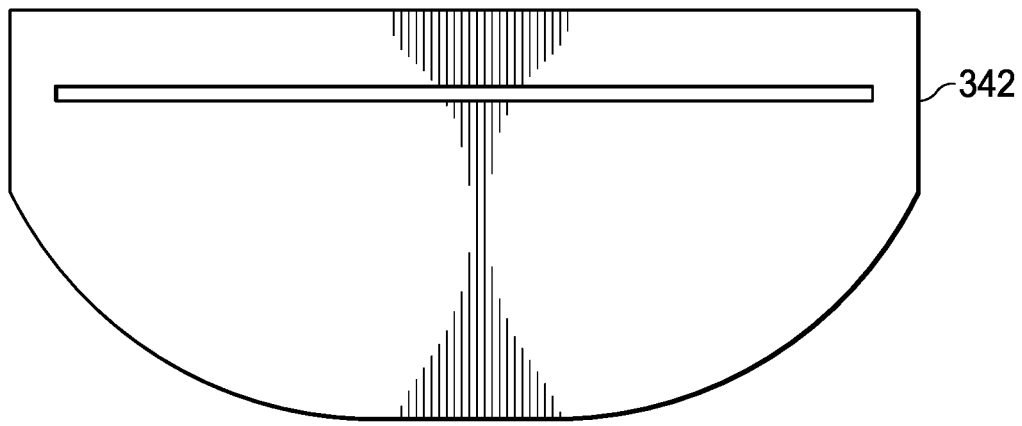
Figure 5C:
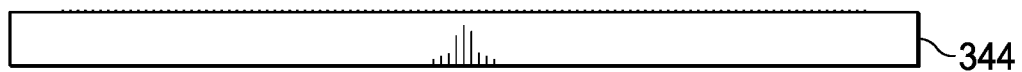

FIGS. 5A-5C are top views 366 of each portion 312, 342, and 344 of the grooved die 306 of FIG. 4.

Figure 6A:
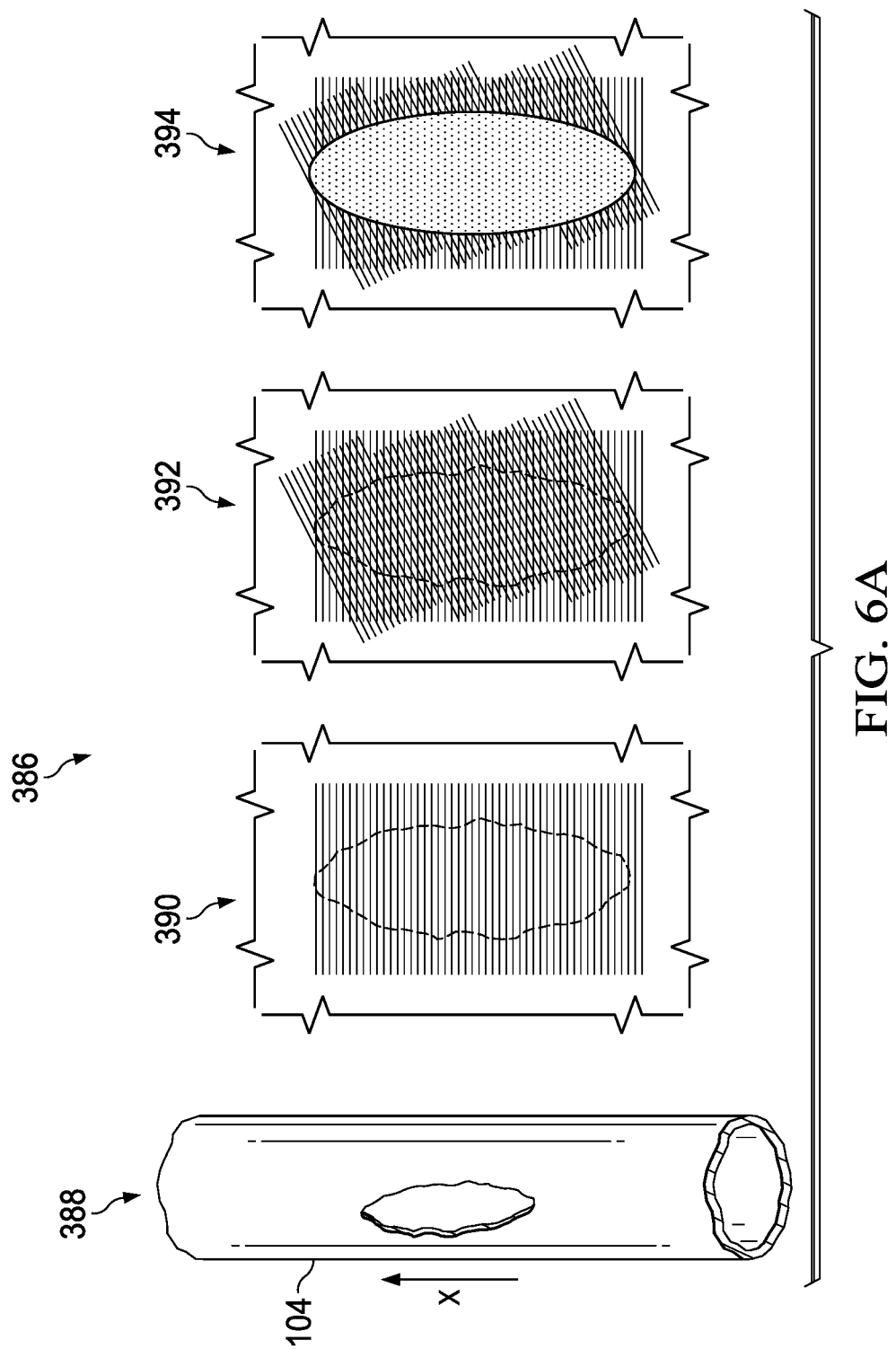
FIGS. 6A-6B illustrate a method for repairing a pipe with a wall loss.
Figure 6B:
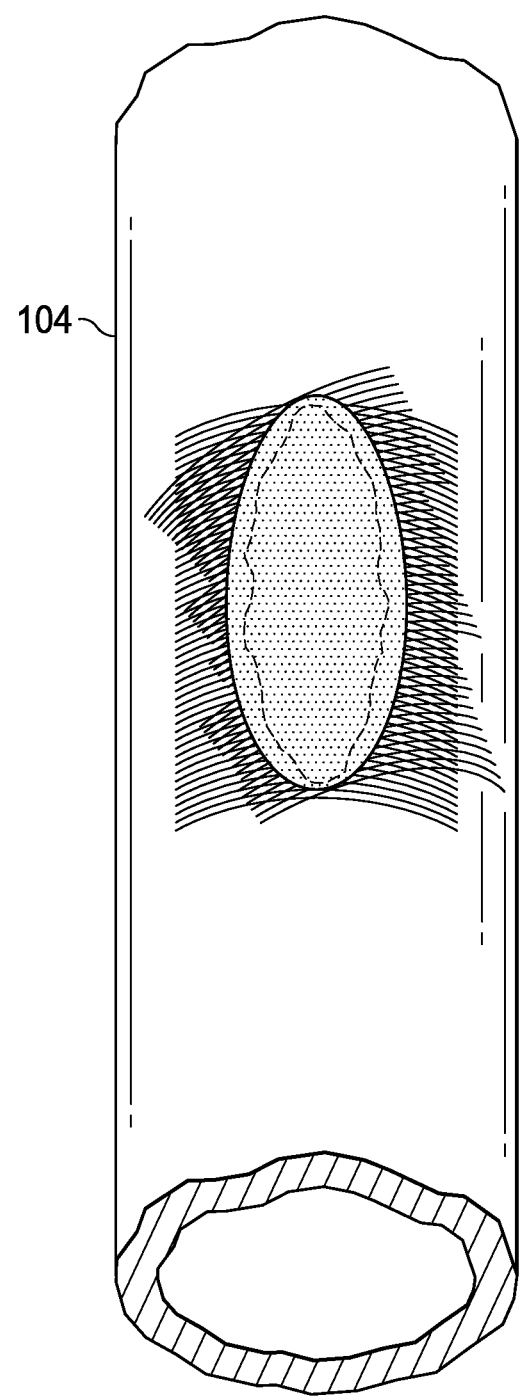

FIGS. 6A-6B illustrate a method 386 for repairing a pipe 104. The robotic arm 102 identifies the wall loss location of the pipe 104 (388) using the control system 109 that includes the sensor module as described earlier with reference to FIGS. 1-2. As described earlier, the printing arm 252 positions itself relative to the pipe 104 to fill the gap due to wall loss. The printing arm 252 with the help of the printer head 256 can fill the gap with fiber and the control system 109 controls the deposition process. A polymer-based material is stored in the printing head 256. The polymer-based material includes fiber, thermoplastic material, or both. The fibers (e.g., carbon fiber, glass fiber, or aramid fiber) can also serve as reinforcement fibers. Once positioned over the gap, the printing head 256 performs a first pass of depositing a mesh of fibers at a first angle orientation in a circular motion (390). Then, the second pass of additional deposition of the same mesh of fibers with the same circular motion is applied over the first pass, this time at a second angle orientation (392). Steps 390 and 392 provide a strong, stable base structure and a strong attachment of the fibers with the pipe's surface. The stable base allows for the final layer, also including thermoplastic fiber material, to be deposited at the same location without falling inside the gap of the pipe (394). In some implementations, the method can deposit rolling fiber yarns around the entire pipe and the wall gap instead of depositing a mesh of fibers. This approach allows the newly repaired pipes to withstand high-pressure operations because of the newly formed stable structure. Thermoplastic-based structures have high stability due to high stiffness-to-weight ratios and other mechanical properties that make them desirable in a variety of applications.

Figure 7:
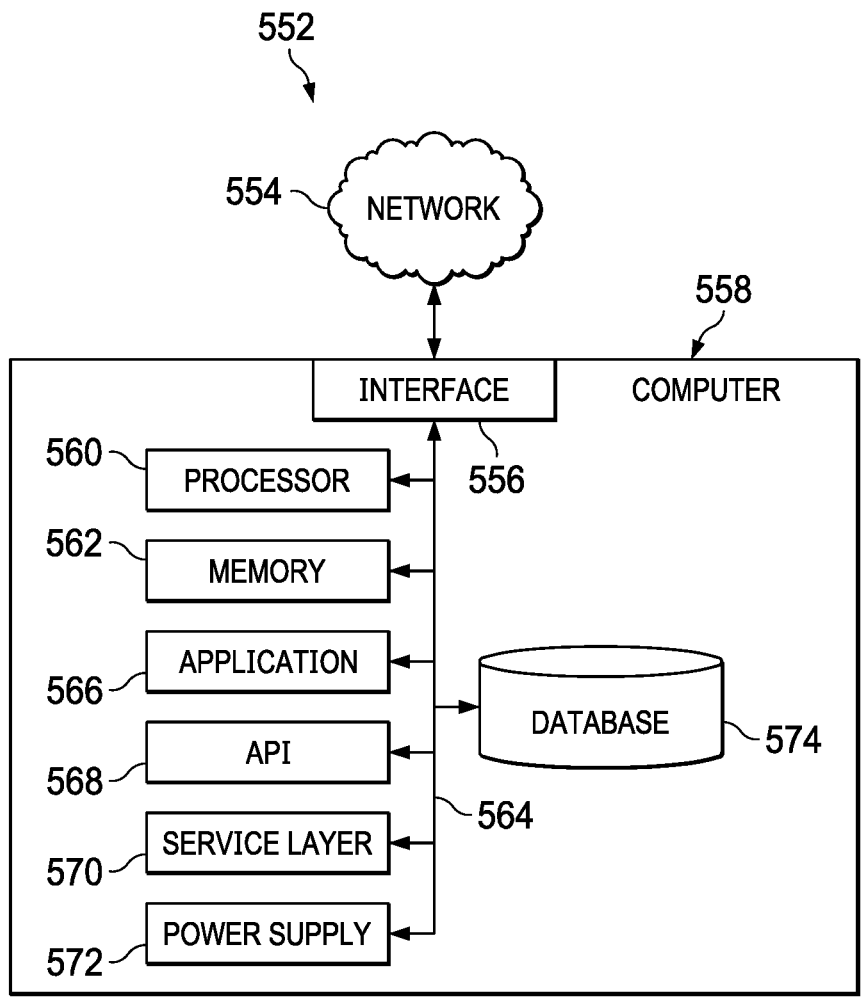
FIG. 7 is a block diagram of an example computer system.

FIG. 7 is a block diagram of an example computer system 552 used to provide computational functionalities associated with described algorithms, methods, functions, processes, flows, and procedures described in the present disclosure, according to some implementations of the present disclosure. The illustrated computer 558 is intended to encompass any computing device such as a server, a desktop computer, a laptop/notebook computer, a wireless data port, a smartphone, a personal data assistant (PDA), a tablet computing device, or one or more processors within these devices, including physical instances, virtual instances, or both. The computer 558 can include input devices such as keypads, keyboards, and touch screens that can accept user information. Also, the computer 558 can include output devices that can convey information associated with the operation of the computer 558 The information can include digital data, visual data, audio information, or a combination of information. The information can be presented in a graphical user interface (UI) (or GUI).

The computer 558 can serve in a role as a client, a network component, a server, a database, a persistency, or components of a computer system for performing the subject matter described in the present disclosure. The illustrated computer 558 is communicably coupled with a network 554. In some implementations, one or more components of the computer 558 can be configured to operate within different environments, including cloud-computing-based environments, local environments, global environments, and combinations of environments.

At a high level, the computer 558 is an electronic computing device operable to receive, transmit, process, store, and manage data and information associated with the described subject matter. According to some implementations, the computer 558 can also include, or be communicably coupled with, an application server, an email server, a web server, a caching server, a streaming data server, or a combination of servers.

The computer 558 can receive requests over network 554 from a client application (for example, executing on another computer 558). The computer 558 can respond to the received requests by processing the received requests using software applications. Requests can also be sent to the computer 558 from internal users (for example, from a command console), external (or third) parties, automated applications, entities, individuals, systems, and computers. Each of the components of the computer 558 can communicate using a system bus 564. In some implementations, any or all of the components of the computer 558, including hardware or software components, can interface with each other or the interface 556 (or a combination of both), over the system bus 564. Interfaces can use an application programming interface (API) 568, a service layer 570, or a combination of the API 568 and service layer 570. The API 568 can include specifications for routines, data structures, and object classes. The API 568 can be either computer-language independent or dependent. The API 568 can refer to a complete interface, a single function, or a set of APIs.

The service layer 570 can provide software services to the computer 558 and other components (whether illustrated or not) that are communicably coupled to the computer 558. The functionality of the computer 558 can be accessible for all service consumers using this service layer. Software services, such as those provided by the service layer 570, can provide reusable, defined functionalities through a defined interface. For example, the interface can be software written in JAVA, C++, or a language providing data in extensible markup language (XML) format. While illustrated as an integrated component of the computer 558, in alternative implementations, the API 568 or the service layer 570 can be stand-alone components in relation to other components of the computer 558 and other components communicably coupled to the computer 558. Moreover, any or all parts of the API 568 or the service layer 570 can be implemented as child or sub-modules of another software module, enterprise application, or hardware module without departing from the scope of the present disclosure.

The computer 558 includes an interface 556. Although illustrated as a single interface 556 in FIG. 7, two or more interfaces 556 can be used according to particular needs, desires, or particular implementations of the computer 558 and the described functionality. The interface 556 can be used by the computer 558 for communicating with other systems that are connected to the network 554 (whether illustrated or not) in a distributed environment. Generally, the interface 556 can include, or be implemented using, logic encoded in software or hardware (or a combination of software and hardware) operable to communicate with the network 554. More specifically, the interface 556 can include software supporting one or more communication protocols associated with communications. As such, the network 554 or the interface's hardware can be operable to communicate physical signals within and outside of the illustrated computer 558.

The computer 558 includes a processor 560. Although illustrated as a single processor 560 in FIG. 7, two or more processors 560 can be used according to particular needs, desires, or particular implementations of the computer 558 and the described functionality. Generally, the processor 560 can execute instructions and can manipulate data to perform the operations of the computer 558, including operations using algorithms, methods, functions, processes, flows, and procedures as described in the present disclosure.

The computer 558 also includes a database 574 that can hold data for the computer 558 and other components connected to the network 554 (whether illustrated or not). For example, database 574 can be an in-memory, conventional, or a database storing data consistent with the present disclosure. In some implementations, database 574 can be a combination of two or more different database types (for example, hybrid in-memory and conventional databases) according to particular needs, desires, or particular implementations of the computer 558 and the described functionality. Although illustrated as a single database 574 in FIG. 7, two or more databases (of the same, different, or combination of types) can be used according to particular needs, desires, or particular implementations of the computer 558 and the described functionality. While database 574 is illustrated as an internal component of the computer 558, in alternative implementations, database 574 can be external to the computer 558.

The computer 558 also includes a memory 562 that can hold data for the computer 558 or a combination of components connected to the network 554 (whether illustrated or not). Memory 562 can store any data consistent with the present disclosure. In some implementations, memory 562 can be a combination of two or more different types of memory (for example, a combination of semiconductor and magnetic storage) according to particular needs, desires, or particular implementations of the computer 558 and the described functionality. Although illustrated as a single memory 562 in FIG. 7, two or more memories 562 (of the same, different, or combination of types) can be used according to particular needs, desires, or particular implementations of the computer 558 and the described functionality. While memory 562 is illustrated as an internal component of the computer 558, in alternative implementations, memory 562 can be external to the computer 558.

The application 566 can be an algorithmic software engine providing functionality according to particular needs, desires, or particular implementations of the computer 558 and the described functionality. For example, application 566 can serve as one or more components, modules, or applications. Further, although illustrated as a single application 566, the application 566 can be implemented as multiple applications 566 on the computer 558. In addition, although illustrated as internal to the computer 558, in alternative implementations, the application 566 can be external to the computer 558.

The computer 558 can also include a power supply 572. The power supply 572 can include a rechargeable or non-rechargeable battery that can be configured to be either user- or non-user-replaceable. In some implementations, the power supply 572 can include power-conversion and management circuits, including recharging, standby, and power management functionalities. In some implementations, the power-supply 572 can include a power plug to allow the computer 558 to be plugged into a wall socket or a power source to, for example, power the computer 558 or recharge a rechargeable battery.

There can be any number of computers 558 associated with, or external to, a computer system containing computer 558, with each computer 558 communicating over network 554. Further, the terms "client," "user," and other appropriate terminology can be used interchangeably, as appropriate, without departing from the scope of the present disclosure. Moreover, the present disclosure contemplates that many users can use one computer 558 and one user can use multiple computers 558.

Implementations of the subject matter and the functional operations described in this specification can be implemented in digital electronic circuitry, intangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially-generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A robotic tool for repairing a pipe in-situ, the robotic tool comprising:
a robotic body with an annular, cylindrical configuration with a first end and a second end opposite the first end, the robotic body having an inner surface defining an axis;
a printing arm attached to the inner surface of the robotic body using a track, the printing arm circumferentially movable along the inner surface of the robotic body;
a printing head attached to the printing arm, the printing head movable radially along the printing arm and axially relative to the printing arm; and
a plurality of legs positioned at axial intervals around the robotic body, extending longitudinally from the robotic body, each leg of the plurality of legs having a first end pivotably attached to the robotic body and a second end spaced apart from the robotic body along the axis and pivotable to transition between an open position in which the leg extends in a direction of the axis and a closed position in which the leg extends at an angle to the axis with the second end of the leg conforming to a size of the pipe.

2. The robotic tool of claim 1, wherein the inner surface of the robotic body defines the track, the track extending circumferentially along the inner surface.

3. The robotic tool of claim 1, wherein the printing arm changes length.

4. The robotic tool of claim 1, wherein each of the plurality of legs is attached to the robotic body with a hinge.

5. The robotic tool of claim 1, wherein each of the plurality of legs comprises a rotating end member at a free end of the legs.

6. The robotic tool of claim 5, wherein the rotating end member comprises a wheel.

7. The robotic tool of claim 5, wherein the rotating end member allows each leg to slide along a length of a damaged pipe up until the robotic tool reaches a damaged area of the damaged pipe.

8. The robotic tool of claim 7, wherein the rotating end member allows each leg to transition to the closed position and the robotic tool to conform to the size of the damaged pipe.

9. The robotic tool of claim 1, wherein the robotic body has a clamshell configuration.

10. The robotic tool of claim 1, wherein the robotic tool is controlled by a wireless controller.

11. The robotic tool of claim 1, wherein the printing head comprises: a fiber spreader configured to spread dry fiber tows; a polymer extruder; and a movable die fluidically coupled to the polymer extruder to receive molten polymer from the polymer extruder, and the movable die configured to receive the spread dry fiber tows from the fiber spreader.

12. A robotic tool for repairing a pipe in-situ, the robotic tool comprising:
   a robotic body with an annular, cylindrical configuration with a first end and a second end opposite the first end, the robotic body having an inner surface defining an axis;
   a printing arm attached to the inner surface of the robotic body using a track, the printing arm circumferentially movable along the inner surface of the robotic body;
   a printing head attached to the printing arm, the printing head movable radially along the printing arm and axially relative to the printing arm; and
   a plurality of legs positioned at axial intervals around the robotic body, extending longitudinally from the robotic body, each leg pivotably attached to the robotic body and pivotable to transition between an open position in which the leg extends in a direction of the axis and a closed position in which the leg extends at an angle to the axis with the leg conforming to a size of the pipe, each of the plurality of legs comprises a rotating end member at a free end of the legs, wherein the rotating end member comprises a magnetic material.

13. A robotic system for repairing a pipe in-situ, the robotic system comprising:
   a robotic body with an annular, cylindrical configuration with a first end and a second end opposite the first end, the robotic body having an inner surface defining an axis;
   a printing arm attached to the inner surface of the robotic body using a track;
   a printing head attached to the printing arm, the printing head comprising;
      a fiber spreader configured to spread dry fiber tows;
      a polymer extruder; and
      a movable die fluidically coupled to the polymer extruder to receive molten polymer from the polymer extruder, the movable die configured to receive the spread dry fiber tows from the fiber spreader;
   a plurality of legs positioned at axial intervals around the robotic body, extending longitudinally from the robotic body, each leg of the plurality of legs having a first end pivotably attached to the robotic body and a second end spaced apart from the robotic body along the axis and pivotable to transition between an open position in which the leg extends in a direction of the axis and a closed position in which the leg extends at an angle to the axis with the second end of the leg conforming to a size of the pipe; and
   a communication device communicably connected to the robotic body, and the printing arm.

14. A robotic system for repairing a pipe in-situ, the robotic system comprising:
   a robotic body with an annular, cylindrical configuration with a first end and a second end opposite the first end, the robotic body having an inner surface defining an axis;
   a printing arm attached to the inner surface of the robotic body using a track;
   a printing head attached to the printing arm, the printing head comprising;
      a fiber spreader configured to spread dry fiber tows;
      a polymer extruder; and
      a movable die fluidically coupled to the polymer extruder to receive molten polymer from the polymer extruder, the movable die configured to receive the spread dry fiber tows from the fiber spreader, wherein the movable die further comprising an internal grooved surface defining longitudinal grooves extending between an inlet of the movable die and an outlet of the movable die through which the spread dry fiber tows exit the movable die, the inlet configured to receive the spread dry fiber tows from the fiber spreader;
   a plurality of legs positioned at axial intervals around the robotic body, extending longitudinally from the robotic body and pivotable to transition between an open position in which the leg extends in a direction of the axis and a closed position in which the leg extends at an angle to the axis with the leg conforming to a size of the pipe; and
   a communication device communicably connected to the robotic body, the plurality of legs, and the printing arm.

15. The robotic system of claim 14, wherein the movable die further comprising an internal channel configured to flow the molten polymer from a fluid inlet of the internal channel to the spread dry fiber tows to wet the spread dry fiber tows, forming spread wet fiber tows.

16. The robotic system of claim 15, wherein the longitudinal grooves are configured to help prevent the spread wet fiber tows from mingling as the spread wet fiber tows move along the longitudinal grooves to exit the movable die.

17. The robotic system of claim 15, wherein the movable die is configured to deposit a layer of the spread wet fiber tows on a printing surface to form a thermoplastic component of one or more layers of fiber tows on the printing surface.

18. The robotic system of claim 17, wherein the printing surface comprises a pipe.

19. A method for repairing a pipe in-situ, the method comprising:

sliding, by a plurality of legs, a robotic tool along a pipe, the plurality of legs positioned at axial intervals around a robotic body of the robotic tool, the robotic body defining an axis, the plurality of legs extending longitudinally from the robotic body, each leg of the plurality of legs having a first end pivotably attached to the robotic body and a second end spaced apart from the robotic body along the axis and pivotable to transition between an open position in which the leg extends in a direction of the axis and a closed position in which the leg extends at an angle to the axis with the second end of the leg conforming to a size of the pipe;

identifying a plurality of locations with a gap or with a loose inner thickness in the pipe;

positioning the robotic tool above the identified gap location of the pipe and conforming the robotic tool to a circumference of the pipe;

depositing a first layer of mesh of fibers at a first angle orientation to cover the gap of the pipe;

depositing a second layer of mesh of fibers at a second angle orientation to cover the gap of the pipe, the second angle orientation being different than the first angle orientation;

depositing a final layer comprising a thermoplastic fiber material on top of the second layer of mesh of fibers; and closing the identified gap location of the pipe to withstand high-pressure operations.

* * * * *